Sept. 27, 1960 R. THEILE 2,954,424

COLOUR TELEVISION RECEIVING APPARATUS

Filed April 16, 1953

Inventor
RICHARD THEILE
By Holcombe Wetherill & Brisebois
Attorney

United States Patent Office 2,954,424
Patented Sept. 27, 1960

2,954,424

COLOUR TELEVISION RECEIVING APPARATUS

Richard Theile, Marburg (Lahn), Germany, assignor to Pye Limited, Cambridge, England, a British company

Filed Apr. 16, 1953, Ser. No. 349,203

Claims priority, application Great Britain Apr. 25, 1952

2 Claims. (Cl. 178—5.4)

The present invention relates to a method of and apparatus for reproducing colour television signals.

In the transmission of television pictures in colour the colour content of each picture element is analysed into two, three or more colour components, for example red, blue and green, these colour components being converted into corresponding electric signals which are transmitted to the reproducing apparatus. The colour component of the different picture elements may be analysed in sequence for each picture element (dot sequential scanning), for each line of the picture (line sequential scanning) or for each frame (frame sequential scanning) the colour component signals occurring in the predetermined sequence for each dot, line or frame in accordance with the selected system.

The present invention more particularly relates to apparatus for reproducing the colour pictures in which the picture signals corresponding to the different colour components are employed to illuminate a colour screen comprising a large number of colour reproducing elements capable of reproducing the different colours corresponding to the colour components of the transmitted waveform. The received signals are distributed to different picture points on the screen so that the colour component signals will illuminate the corresponding colour reproducing elements at the different points on the screen corresponding to the same picture points on the transmitted picture, whereby the colour picture will be synthesised in the reproducing apparatus. Normally the received colour component signals are caused to modulate a scanning beam of electromagnetic energy, such as a beam of light or a beam of cathode rays, which is deflected to scan the screen in synchronism with the scanning of the picture at the transmitter, the beam sequentially illuminating the different colour-reproducing elements of the screen in the same sequence as the colour component signals occur in the received waveform. The screen may comprise translucent colour filters arranged in the form of dots or lines through which the modulated beam is viewed either directly, in the case of a light beam or indirectly by means of a fluorescent screen in the case of the cathode ray beam. In a further form the screen may comprise phosphors which glow with different colours when irradiated by the cathode ray beam, the different phosphors being disposed in the form of dots or lines over the surface of the screen.

It will be appreciated that for correct colour reproduction, the beam, when modulated by a particular colour component signal, must at that instant impinge on a point of the screen which reproduces the same colour, and considerable difficulty is experienced in the deflection of the beam so that at any instant it will impinge upon a colour-reproducing element corresponding to the colour component signal with which the beam is being instantaneously modulated.

The present invention solves this problem by providing an optical pick-up means which are illuminated by the reproduced picture and are rendered colour selective in synchronism with the different colour-component signals of the received television waveform, the output from the optical pick-up means being employed to cause the different colour-component signals to illuminate only the corresponding colour-reproducing elements of the screen. Thus, if the beam illuminates a colour-reproducing element of the screen different from that corresponding to the colour component signal with which the scanning beam is being instantaneously modulated, the pick-up means exercise a controlling action either to suppress or attenuate the beam or to alter its position relative to the screen so that only the correct colour will be reproduced.

The invention thus provides a method of reproducing colour television signals which consists in employing the output from optical pick-up means which are illuminated by the reproduced picture and are rendered colour selective in synchronism with the different colour component signals of the received television waveform to cause the different colour component signals to produce only the corresponding colours in the reproduced picture.

The invention also consists in an apparatus for reproducing colour television signals wherein signals representative of individual colour components of a transmitted picture are caused selectively to illuminate the corresponding colour reproducing elements of a screen comprising a large number of such elements, thereby to synthesise a colour reproduction of the received signals, characterised by colour selective pick-up means adapted to analyse the reproduction and compensate automatically for incorrect colour synthesis.

A feature of the invention consists in apparatus for reproducing colour television signals wherein the received colour-component signals are reproduced on a multi-colour screen comprising a large number of colour-reproducing elements which are illuminated in accordance with the modulation of the signals to reproduce the colour picture, characterised in that the light emitted from the screen illuminates a plurality of colour-sensitive pick-up devices, said devices corresponding in number and being respectively sensitive to the different colour components of the picture and being selectively rendered inoperative in synchronism with the reproduction of the corresponding colour components of the received signal, each of said pick-up devices, when operative, causing suppression or attenuation of the signals when the screen reproduces its corresponding colour.

A further feature consists in an apparatus for reproducing colour television signals wherein the received signals are caused to modulate a beam of electromagnetic energy which is deflected to scan a screen comprising a large number of colour-reproducing elements, said elements reproducing different colours corresponding to the colour components of the signal, thereby to reproduce a colour picture corresponding to the transmitted picture, characterised in that the light emitted from the screen illuminates a plurality of colour-sensitive pick-up devices, said devices corresponding in number to and being respectively sensitive to the colour components of the picture and each acting to suppress or attenuate the beam when illuminated by a colour different from that to which that device is sensitive, means being provided for rendering said pick-up devices inoperative to suppress the beam when the beam is being modulated by the corresponding colour component of the signal.

From another aspect the invention also consists in an apparatus for reproducing colour television signals wherein the received signals are caused to modulate a beam of electromagnetic energy which is deflected to scan a screen comprising a large number of colour-reproducing elements, said elements reproducing different colours corresponding to the colour components of the signal, thereby to reproduce a colour picture corresponding to the transmitted picture, and wherein the colour-reproducing elements are arranged in a predetermined sequential order and means are provided for periodically suppressing or attenuating the beam during the time that it is sweeping between two successive elements of the same colour, and wherein the light emitted from the screen illuminates a plurality of colour-sensitive pick-up devices, said devices corresponding in number and being respectively sensitive to the colour components of the picture and being selectively rendered inoperative in synchronism with and corresponding to the modulation of the beam by the successive colour components of the signal, and wherein means are provided for altering the phase relationship between the beam and the elements of the screen when a pick-up device is illuminated by light of a colour corresponding to that to which it is sensitive and with which the beam is being modulated at that instant.

In one embodiment according to the invention the colour-reproducing elements may be disposed either at random or in a predetermined pattern over the surface of the screen which is scanned by the beam which is modulated with the colour component signals in the predetermined sequence. The pick-up means may comprise, in a three-colour system, three photo-cells responsive either by their inherent sensitivity and/or in association with colour filters associated therewith, respectively to the three-colour components, for example red, green and blue, of the system. The outputs from the photo-cells are fed through a feedback circuit which is arranged to suppress or attenuate the scanning beam when the cell is illuminated by light of a colour corresponding to its sensitivity. The photo-cells are successively switched, for example pulsed, to render them sequentially inoperative and in synchronism with the colour component signals of the received waveform; that is to say, when the beam is being modulated by the red colour component signals, the photo-cell responsive to red light is rendered inoperative and so on. Such synchronising means may take any one of the many forms known in the art and therefore it is not considered necessary to describe such means specifically. Thus when the beam is being modulated by the red colour component signals the photo-cells do not exercise any beam-suppressing or attenuating effect so long as the beam is illuminating a red colour-reproducing element of the screen. As soon, however, as the beam illuminates a different colour-reproducing element, one or other of the two photo-cells which are operative produce an output to suppress or attenuate the beam and, therefore, prevent inaccurate colour reproduction. The time constant of the suppression circuit must be very short so that the beam will be suppressed or attenuated immediately it commences to reproduce the incorrect colour. Thus the arrangement according to the invention ensures that only red colour will be reproduced when the beam is being modulated by the red colour component signals; that only the blue colour will be reproduced when the beam is being modulated by the blue colour component signals, and so on.

In an alternative embodiment according to the invention, the colour-reproducing elements are constituted by a series of narrow strips disposed transverse to the direction of line scanning; that is the strips would be disposed vertically when the picture is scanned in horizontal lines. The colour sequence of the strips corresponds with the sequence of the colour component signals in the received waveform and a sine wave or similar generator is provided for periodically suppressing the scanning beam at the frequency at which the beam scans the colour strips and in such manner that the beam will be on when moving over successive colour strips of the same colour but will be suppressed or attenuated when moving over the area of the screen between successive colour strips of the same colour. With this embodiment, the photo-cells, which may be arranged and pulsed in synchronism with the received colour component signals as in the embodiment previously mentioned, are used to control the phase relationship between the suppressor generator and the means for deflecting the beam across the screen. Thus, if when the beam is being modulated with the red colour component and, when not suppressed, illuminates only the red strips, no controlling action will take place. If, however, the phase relationship shifts so that the beam, when modulated with red colour component signals, illuminates a colour strip of a different colour, the photo-cells will produce an output signal which is applied to alter the phase relationship between the suppressor generator and the beam deflecting currents, and thereby bring the beam back into register with the colour strip of the correct colour.

In order that the invention may be more clearly understood, reference will now be made to the accompanying drawings which show certain embodiments thereof by way of non-limiting example and in which.

Figure 1:
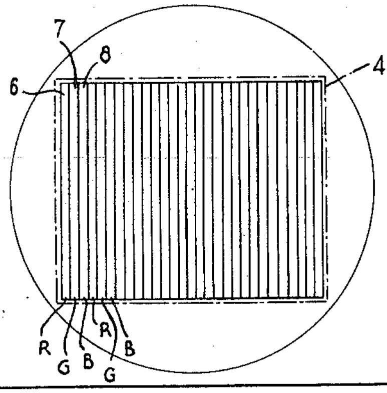
Fig. 1 shows a diagrammatic representation of a screen for a cathode-ray tube suitable for use with the invention.
Figure 2:
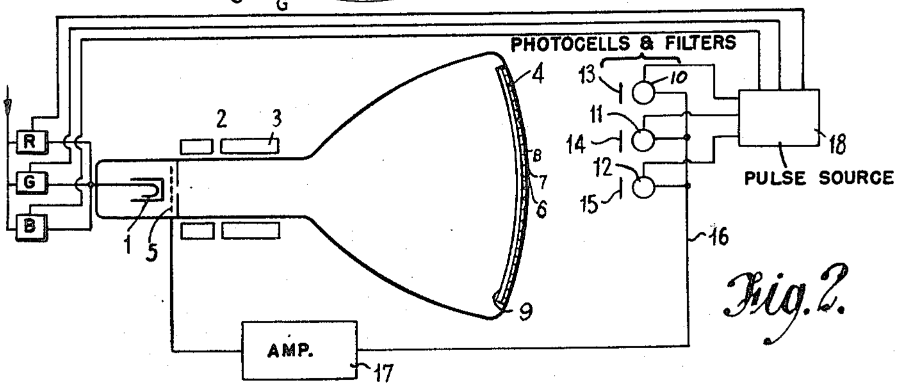
Fig. 2 shows a schematic arrangement of one embodiment of the invention.
Figure 3:
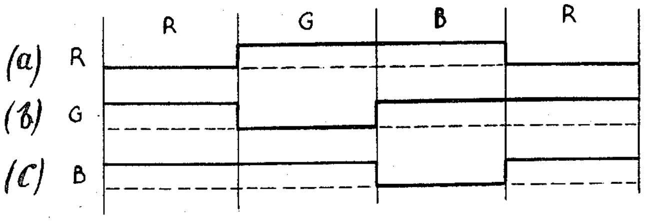
Fig. 3 shows a pulsing diagram applicable to the selective switching of the colour responsive pick-up devices.

In the first specific embodiment illustrated in Figs. 1, 2 and 3, the pictures are reproduced on a cathode-ray tube which is provided with an electron gun 1 and the usual focussing and deflecting coils 2 and 3 whereby the electron beam from the gun may be caused to scan a raster upon a screen 4 associated with the end of the tube, similar to normal television practice. Also, in accordance with conventional practice, there is provided a modulating grid 5 which modulates the electron beam current whereby the spot is altered in intensity in accordance with the amount of modulation applied to the modulating grid. The screen of the tube is provided with a series of striated vertical colour filters 6, 7, 8 in repetitive sequence. There are a large number of these filter elements and they are arranged to run vertically across the screen in any convenient order, for example, red, green and blue, for a three-colour system, as shown. These filters are placed beyond the layer 9 of fluorescent material forming the screen, in the direction of travel of the electron beam that is to say on the side of the screen nearer the viewer. Fig. 1 shows the disposition of the filters beyond the screen layer 9 and it will be understood that each filter and the portion of screen layer with which it is associated comprises a filter element.

Externally of the tube and directed towards its screen 4 is a plurality of photo-electric cells 10, 11, 12 each sensitive to one colour and/or each having an appropriate colour filter in front of it. For example, in a three-colour system the filters shown at 13, 14 and 15 will be red, green and blue. The cells are placed in front of the screen 4 in such a position that the light emitted by the screen can be picked up by the cells without interfering with the viewing of the screen by an on-looker. If desired, the light may be transmitted to the cells by reflection in any convenient manner.

The cells are connected together and the output taken through a feedback loop 16 and appropriate amplifier 17 to the modulating grid 5 of the cathode ray tube and the cells 10, 11, 12 are arranged to be sequentially blanked off by a pulsing arrangement schematically represented at 18 so that they cannot convey a signal back through the feedback loop 16 during their blanking time. The pulsing arrangement for this blanking operation is synchronised with the modulations impressed upon the modulating grid 5 of the cathode-ray tube and corresponding to the sequential colour-component variations, the arrangement being such that while modulations corresponding to any one colour are impressed upon the electron beam, the cell appropriate to that colour is blanked off by the pulsing arrangement.

The operation is as follows:

The colour-component modulations are impressed upon the electron beam sequentially through conventional gating circuits R, G, B (Figure 2): let us assume that the order of energisation is red, green and blue for a three-colour system. The scanning spot is caused to scan over the screen 4 which is thereby caused to fluoresce. The vertically-striated filters 6, 7 and 8 beyond the screen layer 9 therefore colours the transmitted fluorescent light during the scanning action so that the photo-cells receive light impressions varying in colour. Now, assume that for one instant the beam is modulated by the red component of the received picture signal. As the "red" modulated beam sweeps over the screen, the red light transmitted by the red screen filter elements will irradiate all the photo-electric cells but the green and blue-sensitive cells will not be energised since they are not of course sensitive to red and the red-sensitive cell will be blanked off by the pulsing arrangement 18 so that no current will be fed back while the beam is on a red element. However, the scanning beam in its travel will also cause the blue and green filter elements to transmit blue and green light respectively to the cells although the signal bears only "red" modulation, and the cells sensitive to those colours are arranged to be switched on at those instants by the pulsing arrangement 18 so that they will pass current which is fed back to the modulating grid 5 in the sense to suppress or attenuate the beam while it is passing over the blue and green elements. Similarly, when the beam is "blue" modulated there will be beam-suppression feedback from the "red" and "green" cells and during "green" modulation there will be "red" and "blue" feedback. Therefore, during scanning by the beam modulated with any one colour component, the beam will be suppressed when it is being scanned over the portions of the screen in front of the colour filters of the other colours. It will be understood that the delay time in the suppression circuit must be small so that substantially instantaneous suppression or attenuation of the beam is obtained when the beam is passing over the "incorrect" elements. The switching of the photo-cells is shown in the pulsing diagram of Fig. 3. Fig. 3*a* shows the switching during "red" modulation, Fig. 3*b* during "green" modulation and Fig. 3*c* during "blue" modulation. The vertical columns represent the cell outputs.

Preferably, means are provided to cause the scanning beam to dwell on the filter element having a colour corresponding to the modulation impressed at that instant on the beam and to pass rapidly over the other portions of the screen in front of filters of the other two colours. That is to say, if a red colour component is modulating the electron beam, the electron beam is caused to travel at less than normal speed e.g. half speed over the portions of the screen in front of the red filter elements to give a red light output but it is caused to travel very quickly over those portions of the screen behind the green and blue filter elements so as to minimise the transmission by the filter screen of undesired colour variations.

For example the pulse arrangement controlling the feedback may be used to accelerate the beam since it is only when there is feedback that there is need to perform the acceleration.

If desired, the gain in the feedback loop may be controlled by the signal in addition to the gun modulation.

It should be understood that although the invention has been described in connection with coloured filter elements arranged in vertical striations, nevertheless the filter elements could be arranged in irregular order, the filter screen comprising, for example, a mass of grains individually dyed in suitable colours and caused to adhere to a suitable surface.

Figure 4:
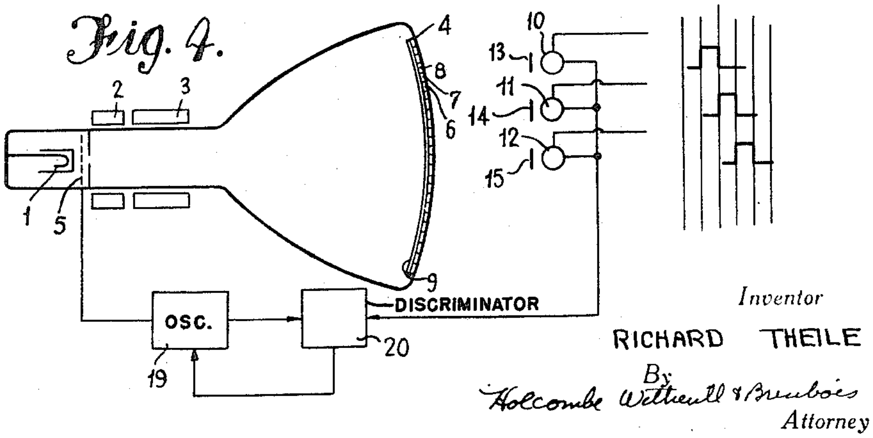
Fig. 4 shows a schematic arrangement of a second embodiment of the invention.

In another embodiment of the invention, shown in Fig. 4 the electron beam within the tube is pulsed at a predetermined frequency, for example, as a first approximation the pulsing may have a sinusoidal character. The arrangement is such that as the beam is caused to sweep over the screen 4 of the tube in a scanning operation only those filter elements thereof are excited that have the same colour as the colour-component modulation of the beam at that instant. For example, suppose the beam at any one instant is bearing "red" colour component modulation, then it is only the red filter elements that are excited by the beam, omitting the blue and green elements. Assuming that the line scanning of the screen is in a horizontal direction, as is normal, the filter elements are arranged vertically in the tube, that is to say, the filter elements are arranged so that the scanning beam sweeps transversely across them.

The pulsating of the scanning beam is effected by means of a suitable local oscillator 19. Assuming the sweeping movement of the scanning spot is absolutely linear with respect to time, then the selection of colour depends upon the phase relation of the pulses to the filter-element group of three colours. It will be understood that the width of the pulse should not exceed that of a single colour element filter strip of the screen.

The signals from the colour selecting photo-cells 10, 11, 12 are, in this embodiment, used to achieve the automatic phase control of the pulsed scanning beam. The selection control for these photo-cells is effected from signals derived from the colour transmission information as set out above.

In practice, however, the scanning motion is only approximately linear and the raster on the screen always shows some residual geometrical distortion and, therefore, it is also necessary to compensate for these distortions.

The photo-electric cell arrangement 10—15 hitherto described is arranged to control the phase and frequency of the oscillator 19 in co-operation with the discriminator 20 so that the feedback control from the cells is not a direct one, as in the first embodiment, but an indirect one and operates similarly to an indirect servo.

It will be understood that although the invention has been described with reference to the use of a fluorescent screen which fluoresces in one colour and which is associated with filters of the appropriate colours for the system concerned, yet, nevertheless, the filer elements may be formed by a screen composed of different coloured phosphors if found desirable.

It will also be understood that although the invention has been described in connection with the use of an electron beam modulated by a modulating grid within a cathode-ray tube, nevertheless, the invention is equally applicable to the use of a beam of light modulated by any convenient arrangement with colour-component variations, means being provided in this instance for projecting the modulated beam of light on to or through a surface having a plurality of colour elements appropriate to the type of colour system utilised, pick-up means in this case being arranged to receive light reflected from or transmitted through its surface and controlled in a manner similar to that described above.

It will, therefore, be appreciated that the invention has been described only by way of example and that various embodiments could be made to the specific details hereinbefore set forth without in any way departing from its scope.

I claim:

1. Apparatus for reproducing colour television signals of the type comprising a cathode-ray tube having a modulating electrode, a multi-colour screen in which colour-component signals are received, said screen comprising a large number of colour-reproducing elements that are illuminated in accordance with the modulation of the signals to reproduce the colour picture, characterized by the fact that there is combined with said tube a plurality of colour-sensitive pick-up devices located for illumination by light from said screen, said devices corresponding in number, and being respectively sensitive, to the different colour components of the picture, means for selectively rendering said devices inoperative in synchronism with the reproduction of the corresponding colour components of the received signal, said pick-up devices being connected in a feed back loop to said modulating electrode for substantial attenuation of the signals when said screen reproduces its corresponding colour, and means for causing the gain of said feedback loop to be controlled by the signal received from said devices.

2. Apparatus as claimed in claim 1 applied to a three-colour reproduction system in which the colour-sensitive pick-up devices comprise three photo-cell arrangements corresponding respectively to the three-colour component of the system.

References Cited in the file of this patent

UNITED STATES PATENTS

| | | |
|---|---|---|
| 2,415,059 | Zworykin | Jan. 28, 1947 |
| 2,490,812 | Huffman | Dec. 13, 1949 |
| 2,552,070 | Sziklai | May 7, 1951 |
| 2,657,257 | Lesti | Oct. 27, 1953 |
| 2,667,534 | Creamer | Jan. 26, 1954 |
| 2,682,571 | Okolicsanyi | June 29, 1954 |
| 2,701,275 | Hulst | Feb. 1, 1955 |
| 2,706,216 | Lesti | Apr. 12, 1955 |
| 2,752,418 | Clapp | June 26, 1956 |